(12) United States Patent
Fan et al.

(10) Patent No.: US 12,115,982 B2
(45) Date of Patent: Oct. 15, 2024

(54) UNMANNED DEVICE CONTROL BASED ON FUTURE COLLISION RISK

(71) Applicant: BEIJING SANKUAI ONLINE TECHNOLOGY CO., LTD, Beijing (CN)

(72) Inventors: Mingyu Fan, Beijing (CN); Shuwang Xu, Beijing (CN); Dongchun Ren, Beijing (CN); Yanliang Zhu, Beijing (CN); Deheng Qian, Beijing (CN); Huaxia Xia, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 327 days.

(21) Appl. No.: 17/698,916

(22) Filed: Mar. 18, 2022

(65) Prior Publication Data
US 2023/0033069 A1 Feb. 2, 2023

(30) Foreign Application Priority Data
Jul. 27, 2021 (CN) .......................... 202110847025.5

(51) Int. Cl.
*B60W 30/095* (2012.01)
*B60W 50/00* (2006.01)
(Continued)

(52) U.S. Cl.
CPC .... *B60W 30/0956* (2013.01); *B60W 50/0097* (2013.01); *B60W 60/0027* (2020.02);
(Continued)

(58) Field of Classification Search
CPC ......... B60W 30/0956; B60W 50/0097; B60W 60/0027; B60W 2050/0022;
(Continued)

(56) References Cited

U.S. PATENT DOCUMENTS 9,248,834 B1 * 2/2016 Ferguson .......... B60W 50/0097
2010/0100325 A1 * 4/2010 Lovell .................... G08G 1/164
701/301
(Continued)

FOREIGN PATENT DOCUMENTS

CN 103823466 A 5/2014
CN 111427369 A 7/2020
(Continued)

OTHER PUBLICATIONS

The State Intellectual Property Office of People's Republic of China, First Office Action in Patent Application No. CN202110847025.5 issued on Sep. 1, 2021, which is a foreign counterpart application corresponding to this U.S. Patent Application, to which this application claims priority.

*Primary Examiner* — Abby Y Lin
*Assistant Examiner* — Dylan M Katz
(74) *Attorney, Agent, or Firm* — Kolitch Romano Dascenzo Gates LLC (57) ABSTRACT

An unmanned device acquires sensing data of surrounding obstacles; determines, for each obstacle, at least one predicted track of the obstacle in a future period of time based on the sensing data; determines, for each moment in the future period of time and according to the predicted track corresponding to the obstacle, a collision probability that a collision with the obstacle occurs at each position in a target region at the moment; and determines a global collision probability that the collision with the obstacle occurs in the entire target region at the moment. According to the global collision probability corresponding to each obstacle at each moment, the unmanned device controls the unmanned device in the future period of time.

15 Claims, 4 Drawing Sheets

(51) Int. Cl.
*B60W 60/00* (2020.01)
*G05D 1/00* (2024.01)

(52) U.S. Cl.
CPC ... *G05D 1/0214* (2013.01); *B60W 2050/0022* (2013.01); *B60W 2554/4042* (2020.02)

(58) Field of Classification Search
CPC . B60W 2554/4042; B60W 2050/0025; B60W 60/00272; G05D 1/0214; G05D 1/106
See application file for complete search history.

(56) References Cited

U.S. PATENT DOCUMENTS

| | | | |
|---|---|---|---|
| 2011/0160950 A1 | 6/2011 | Naderhirn et al. | |
| 2013/0223686 A1* | 8/2013 | Shimizu | G08G 1/166 382/103 |
| 2016/0103218 A1* | 4/2016 | Mandava | B60Q 5/006 701/301 |
| 2016/0355181 A1 | 12/2016 | Morales Teraoka et al. | |
| 2018/0141544 A1* | 5/2018 | Xiao | B60W 10/08 |
| 2018/0345958 A1* | 12/2018 | Lo | G08G 1/096725 |
| 2019/0234751 A1* | 8/2019 | Takhirov | G01C 21/3461 |

FOREIGN PATENT DOCUMENTS

| | | |
|---|---|---|
| CN | 111599179 A | 8/2020 |
| CN | 111951552 A | 11/2020 |
| CN | 112799411 A | 5/2021 |
| CN | 112987760 A | 6/2021 |

\* cited by examiner

UNMANNED DEVICE CONTROL BASED ON FUTURE COLLISION RISK

CROSS-REFERENCE TO RELATED APPLICATIONS

This application claims priority to Chinese Patent Application No. 202110847025.5, entitled "UNMANNED DEVICE CONTROL METHOD AND APPARATUS BASED ON FUTURE COLLISION RISK" and filed on Jul. 27, 2021, which is incorporated by reference in its entirety.

TECHNICAL FIELD

This application relates to the field of unmanned driving, and in particular, to unmanned device control based on a future collision risk.

BACKGROUND

With the continuous development of information technologies, unmanned driving technologies have been widely used in various fields.

Unmanned devices generally implement automatic driving through track planning. The unmanned devices need to require related data of surrounding obstacles and predict traveling tracks of the surrounding obstacles based on the related data, and then perform track planning based on the predicted traveling tracks of the surrounding obstacles. In a region to which the unmanned device is going, the obstacles in that region may collide with each other, which complicates prediction of the traveling tracks of the obstacles. It is challenging to determine the possible collision between the obstacles in a future time period.

SUMMARY

This application provides unmanned device control based on a future collision risk.

This application provides an unmanned device control method based on a future collision risk, applicable to a field of unmanned driving, the method including: acquiring sensing data of obstacles around an unmanned device; determining, for each obstacle and according to the sensing data, at least one traveling track of the obstacle in a future period of time, to obtain a predicted track corresponding to the obstacle; determining, for each moment in the future period of time and according to the predicted track corresponding to the obstacle, a collision probability that a collision with the obstacle occurs at each position in a target region at the moment, where the target region is a region in which the unmanned device is located in the future period of time; determining, according to the collision probability that the collision with the obstacle occurs at each position in the target region at the moment, a global collision probability that the collision with the obstacle occurs in the entire target region at the moment as a global collision probability corresponding to the obstacle at the moment; and controlling the unmanned device in the future period of time according to the global collision probability corresponding to each obstacle at each moment.

This application provides an unmanned device, including a memory, a processor, and a computer program stored on the memory and capable of being run on the processor, where the processor, when executing the program, implements the following steps: acquiring sensing data of obstacles around an unmanned device; determining, for each obstacle and according to the sensing data, at least one traveling track of the obstacle in a future period of time, to obtain a predicted track corresponding to the obstacle; determining, for each moment in the future period of time and according to the predicted track corresponding to the obstacle, a collision probability that a collision with the obstacle occurs at each position in a target region at the moment, where the target region is a region in which the unmanned device is located in the future period of time; determining, according to the collision probability that the collision with the obstacle occurs at each position in the target region at the moment, a global collision probability that the collision with the obstacle occurs in the entire target region at the moment; and controlling the unmanned device in the future period of time according to the global collision probability corresponding to each obstacle at each moment.

This application provides a computer-readable storage medium storing a computer program, where the computer program, when being executed by a processor, implements the following steps: acquiring sensing data of obstacles around an unmanned device; determining, for each obstacle and according to the sensing data, at least one traveling track of the obstacle in a future period of time, to obtain a predicted track corresponding to the obstacle; determining, for each moment in the future period of time and according to the predicted track corresponding to the obstacle, a collision probability that a collision with the obstacle occurs at each position in a target region at the moment, where the target region is a region in which the unmanned device is located in the future period of time; determining, according to the collision probability that the collision with the obstacle occurs at each position in the target region at the moment, a global collision probability that the collision with the obstacle occurs in the entire target region at the moment; and controlling the unmanned device in the future period of time according to the global collision probability corresponding to each obstacle at each moment.

In the unmanned device control method based on a future collision risk provided in this application, sensing data of obstacles around an unmanned device is acquired, for each obstacle, at least one predicted track of the obstacle in a future period of time is obtained based on the sensing data, then, for each moment in the future period of time and according to the predicted track corresponding to the obstacle, a collision probability that a collision with the obstacle occurs at each position in a target region at the moment is determined, a global collision probability that the collision with the obstacle occurs in the entire target region at the moment is further determined, and finally, the unmanned device is controlled in the future period of time according to the global collision probability corresponding to each obstacle at each moment.

It can be learned from the method that an unmanned device can predict predicted tracks of surrounding obstacles in a future period of time, and determine, based on the predicted tracks, global collision conditions of the obstacles in a target region to which the unmanned device is going. Therefore, it can be ensured that the unmanned device can effectively avoid collision accidents in the target region based on the determined global collision conditions, to ensure safety traveling of the unmanned device in the future period of time, thereby ensuring the traveling efficiency of the unmanned device. In contrast, in the prior art, an unmanned device cannot effectively predict collisions between obstacles in a front section (that is, a section to which the unmanned device will enter). As a result, the unmanned device faces a relatively large collision risk when traveling to the front section, and safety traveling of the unmanned device cannot be effectively ensured.

DETAILED DESCRIPTION

The following describes the technical solution provided in each embodiment of this application in detail with reference to the accompanying drawings.

Figure 1:
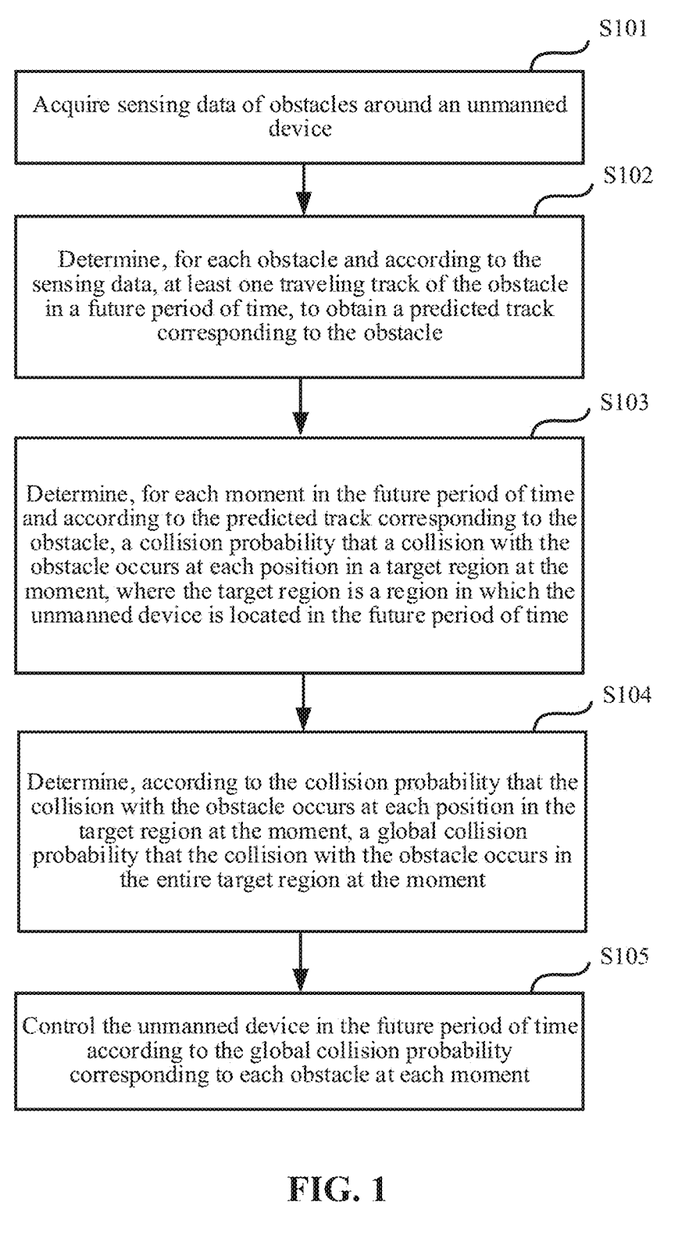
FIG. 1 is a schematic flowchart of an unmanned device control method based on a future collision risk according to this application.

FIG. 1 is a schematic flowchart of an unmanned device control method based on a future collision risk according to this application. The method is applicable to a field of unmanned driving and performed by an unmanned device. The method includes the following steps.

S101. Acquire sensing data of obstacles around an unmanned device.

During traveling, an unmanned device can acquire sensing data of surrounding obstacles by using a sensor disposed on the unmanned device, to predict traveling tracks of the obstacles in a future period of time, and determine, based on the traveling tracks, a traveling decision used by the unmanned device in the future period of time.

In one or more embodiments, the obstacles around the unmanned device refer to dynamic articles such as motor vehicles and pedestrians that may interfere and prevent traveling of the unmanned device. Various approached may be used for the unmanned device to acquire information of the surrounding obstacles, which can be determined according to sensors used by the unmanned device. For example, the unmanned device captures obstacles around the unmanned device by using a disposed laser radar, to acquire point cloud data (that is, sensing data) of the obstacles. In another example, the unmanned device acquires image data (that is, the sensing data) of surrounding obstacles by using a disposed image acquisition device (for example, a camera lens or a camera).

In one or more embodiments, the unmanned device is controlled by a remote server. An example in which an execution body is the remote server is used. The unmanned device sends acquired sensing data of surrounding obstacles to the server, and the server predicts predicted tracks of the obstacles in a future period of time, determines global collision probabilities corresponding to the obstacles at each moment in the future period of time based on the predicted tracks, and then performs a corresponding control policy according to the determined global collision probabilities. Finally, the server can control the unmanned device in the future period of time based on the control policy. In some embodiments, the unmanned device may be an execution body to implement the method of this application. For ease of description, the embodiments in which the unmanned device is the execution body are used for describing the unmanned device control method provided in this application.

In one or more embodiments, the unmanned device refers to a device such as an unmanned vehicle, a robot, or an automatic delivery device that can implement automated/autonomous driving. Based on the foregoing, the unmanned device applying the unmanned device control method based on a future collision risk provided in this application can be configured to perform a delivery task in a delivery field, for example, a service scenario of performing delivery such as express, logistics, or take-out by using the unmanned device.

S102. Determine, for each obstacle and according to the sensing data, at least one traveling track of the obstacle in a future period of time, to be used as a predicted track corresponding to the obstacle.

After acquiring the sensing data of each obstacle, the unmanned device can determine, for each obstacle and according to the sensing data corresponding to the obstacle, at least one traveling track of the obstacle in a future period of time, to obtain a predicted track corresponding to the obstacle.

In other words, the unmanned device can predict at least one traveling track of one obstacle in the future period of time. In some embodiments, the unmanned device may predict a plurality of traveling tracks of one obstacle in the future period of time, and the plurality of traveling tracks are possible future traveling situations determined by the unmanned device. Therefore, these traveling tracks are also referred to as predicted tracks.

In one or more embodiments, the unmanned device inputs acquired sensing data corresponding to one obstacle into a preset track prediction model, to obtain at least one predicted track of the obstacle in a future period of time by using the track prediction model. The track prediction model may use a plurality of algorithms such as a long short-term memory (LSTM) network algorithm and a gate recurrent neural network (gate recurrent unit, GRU) algorithm. The algorithm is not specifically limited in this application.

It should be noted that in one or more embodiments, in addition to determining at least one predicted track of one obstacle in a future period of time, the unmanned device may further determine selection probabilities that the obstacle selects the predicted tracks in the future period of time. For example, the output of the preset track prediction model further provides a selection probability that the obstacle will select the specific predicted track.

Figure 2:
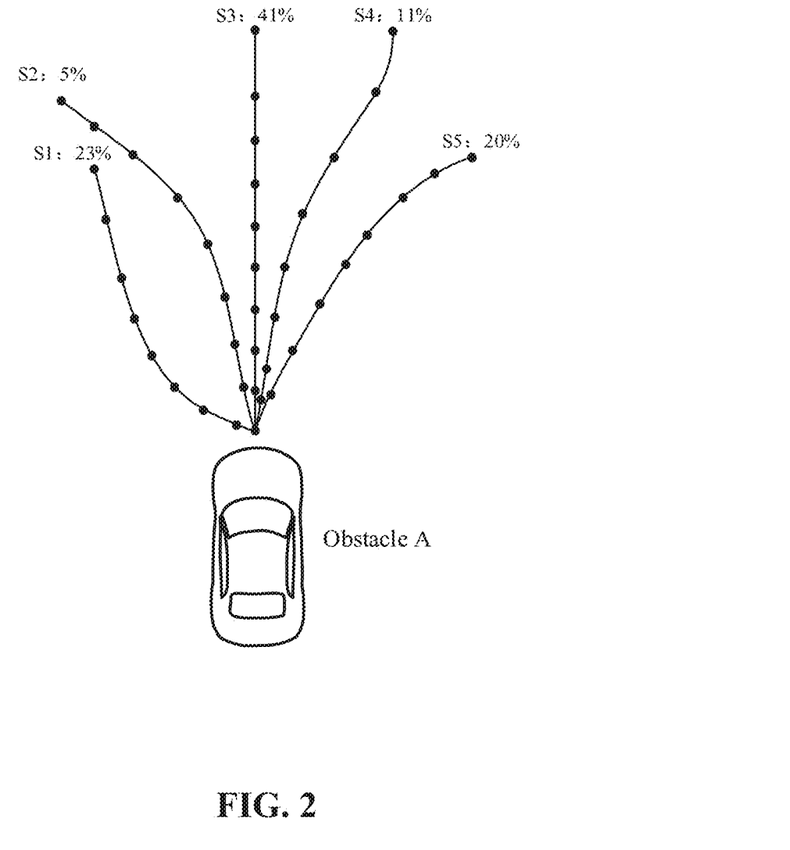
FIG. 2 is a schematic diagram of a plurality of predicted tracks of an obstacle predicted by an unmanned device and a selection probability that the obstacle selects each predicted track according to this application.

FIG. 2 is a schematic diagram of a plurality of predicted tracks of an obstacle predicted by an unmanned device and a selection probability that the obstacle selects each predicted track according to this application.

For example, for an obstacle A around the unmanned device, the unmanned device predicts, by using acquired sensing data of the obstacle A, five predicted tracks S1 to S5 that the obstacle A may travel in the following time (that is, in the future period of time). Each predicted track corresponds to a corresponding selection probability. For example, a selection probability corresponding to a predicted track S1 is 23%, that is, the probability that the obstacle A travels according to the predicted track S1 is 23%. FIG. 2 also shows the selection probability for the predicted tracks S2-S5.

It can be learned from the foregoing example that the selection probability corresponding to each predicted track is also understood as a tendency of the obstacle to each predicted track. That is, when a selection probability corresponding to a predicted track is larger, the obstacle is more inclined to travel according to the predicted track in the future period of time.

In addition, whether one obstacle collides with another obstacle at one position is related to a predicted track selected by the obstacle to some extent. Therefore, the selection probability can further be used for determining a collision probability that one obstacle collides with another obstacle at one position. This content is described in detail in the following.

S103. Determine, for each moment in the future period of time and according to the predicted track corresponding to the obstacle, a collision probability that a collision with the obstacle occurs at each position in a target region at the moment, where the target region is a region in which the unmanned device is located in the future period of time.

To ensure traveling safety of the unmanned device in a future period of time, it is required to predict a collision condition at each moment at each position in a region to which the unmanned device is going next time. Based on the foregoing, in one or more embodiments, the unmanned device determines, for each moment in the future period of time and according to at least predicted track corresponding to the obstacle, a collision probability that a collision with the obstacle occurs at each position in a target region at the moment.

The target region is a region in which the unmanned device is located in the future period of time. Because in an actual application, a time interval when the unmanned device makes a decision is usually short, for example, 5 ms, in one case, obstacles around the unmanned device will also be located in the target region with a high probability.

In one or more embodiments, for any position in the target region, a collision would occur at the position may be understood as that the position is occupied by different obstacles at a same moment. That is, different obstacles are located at the same position at the same moment. Therefore, when determining the collision probability, the unmanned device can determine, for each position in the target region, an overall probability that the obstacle is located at the position at the moment, and then determine, according to the overall probability that the obstacle is located at the position at the moment and overall probabilities that other obstacles are located at the position at the moment, the collision probability that the obstacle collides with the other obstacles at the position at the moment.

For example, for two obstacles, a collision probability that the two obstacles collide at a same position at a same moment is represented by using the following formula:

$$P(X_a^{t'} \cap X_b^{t'} = C) = P(X_a^{t'} = C)P(X_b^{t'} = C).$$

The above formula is used for representing a probability that a first obstacle a and a second obstacle b are located at a position C in a target region at a t' moment, where $P(X_a^{t'}=C)$ is used for representing a probability that the first obstacle a is located at the position C at the t' moment, $P(X_b^{t'}=C)$ is used for representing a probability that the second obstacle b is located at the position C at the t' moment, and a product of the two probabilities is a collision probability that the two obstacles collide at the position C at the t' moment.

In addition, in one or more embodiments, whether one obstacle appears at one position at one moment is related to a predicted track selected by the obstacle. Therefore, for any obstacle around the unmanned device, the unmanned device can determine, for each predicted track corresponding to the obstacle, a selection probability corresponding to the predicted track, where the selection probability indicates a probability that the obstacle selects the predicted track in a future period of time. Subsequently, the unmanned device can determine, according to the selection probability corresponding to each predicted track corresponding to the obstacle and a determined probability that the obstacle is located at the position at the moment when traveling according to each predicted track, an overall probability that the obstacle is located at the position at the moment. In some embodiments, the probability that the obstacle is located at the position at the moment when traveling according to each predicted track may be determined by a track prediction model.

Because there are a plurality of predicted tracks corresponding to one obstacle, the overall probability mentioned herein is used to assess a situation whether the obstacle appears at the position at the moment in general when traveling according to each predicted track. For one obstacle, an overall probability that the obstacle is located at the position at the moment is represented by using, for example, the following formula:

$$P(X_a^{t'} = C) = \sum_{i=1}^{N_a} \pi_i p_i(X_a^{t'} = C)$$

The formula is used for representing an overall probability that the first obstacle a is located at the position C at the t' moment, where $N_a$ is used for representing a quantity of predicted tracks corresponding to the first obstacle a, $\pi_i$ is used for representing a selection probability that the first obstacle a selects an $i^{th}$ predicted track (i is a positive integer), and $p_i(X_a^{t'}=C)$ is used for representing a probability that the first obstacle a is located at the position C at the t' moment after selecting the $i^{th}$ predicted track.

It can be learned from the formula that after determining the probability that the first obstacle a is located at the position C at the t' moment after traveling according to each predicted track, the unmanned device determines, through summation, the overall probability that the first obstacle a is located at the position C at the t' moment.

It should be noted that, obstacles around the unmanned device do not necessarily appear at all positions in the target region in the future period of time, that is, some positions are occupied by the obstacles, and some positions are not occupied by the obstacles. Therefore, a probability whether one obstacle appears at one position in the target region at one moment can be determined by using a degree of which the obstacle approaches the one position at the moment when traveling according to a predicted track. The degree of approaching the position in the target region is represented by a distance between the obstacle and the position in the target region, that is, a shorter distance between the obstacle and the position in the target region indicates a higher degree of which the obstacle approaches the position in the target region.

In one or more embodiments, when determining the probability that the obstacle is located at the position in the target region at the moment when traveling according to each predicted track, the unmanned device determines, for each predicted track corresponding to the obstacle, an expected position of the obstacle at the moment when the obstacle travels according to the predicted track. Subsequently, the unmanned device determines a position deviation corresponding to the obstacle in the predicted track, where the position deviation indicates a position deviation between the expected position and the position in the target region. Finally, the unmanned device determines, according to the position deviation corresponding to the obstacle in each predicted track, the probability that the obstacle is located at the position in the target region at the moment when traveling according to each predicted track. The position deviation corresponding to the obstacle in each predicted track is negatively correlated with the probability that the obstacle is located at the position in the target region at the moment when traveling according to each predicted track. That is, a smaller position deviation corresponding to the obstacle in each predicted track indicates a larger probability that the obstacle is located at the position in the target region at the moment when traveling according to each predicted track.

In one or more embodiments, the expected position is understood as a position in which the obstacle should appear at the moment after traveling according to a predicted track. In other words, the expected position is also a track point corresponding to the moment in the predicted track. It can be learned from the above content that for any predicted track selected by the obstacle, after the obstacle travels according to the predicted track, a shorter distance between an expected position at the moment and the position in the target region indicates a larger possibility that the obstacle appears at the position at the moment when traveling according to the predicted track.

Figure 3:
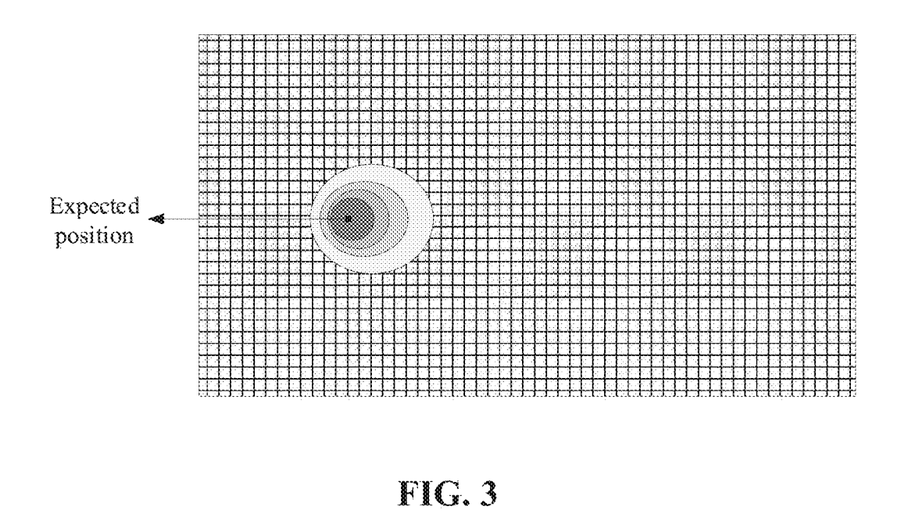
FIG. 3 is a schematic diagram of a relationship between a distance between an expected position of an obstacle at a moment and each position in a target region and a probability that the obstacle occupies each position at the moment according to this application.

Stated from another perspective, at one moment, for a position (i.e., a position in the target region) closer to an expected position at the moment, an occupied probability that the obstacle occupies the position is larger, FIG. 3 is a schematic diagram of a relationship between a distance between an expected position of an obstacle at a moment and each position in a target region and a probability that the obstacle occupies the each position at the moment according to this application.

In FIG. 3, an area closer to the expected position is illustrated with a darker color and indicates that the obstacle has a larger probability to be located at the positions (i.e., the positions in the darker area) closer to the expected at the moment. The areas farther from the expected position is illustrated with a lighter color and indicates that the obstacle has a smaller probability to be located at the positions farther from the expected point at the moment.

In one or more embodiments, the unmanned device may determine the probability that the obstacle is located at the position in the target region at the moment when traveling according to each predicted track in another manner. For example, the unmanned device determines, for each predicted track corresponding to the obstacle, a corresponding traveling speed when the obstacle travels according to the predicted track at the moment. Subsequently, the unmanned device determines, according to the traveling speed corresponding to each predicted track of the obstacle at the moment, the probability that the obstacle is located at the position at the moment when traveling according to each predicted track.

The traveling speed mentioned herein is a vector and includes a traveling direction and a specific speed value. Therefore, a distance between the obstacle and the position in the target region at the moment is negatively correlated with the probability that the obstacle is located at the position in the target region at the moment when traveling according to each predicted track. That is, according to the traveling speed corresponding to each predicted track of the obstacle at the moment, when it is determined that the obstacle more approaches the position in the target region in the target region at the moment, it indicates a larger probability that the obstacle is located at the position at the moment when traveling according to each predicted track. That is, the traveling direction can be understood as whether the obstacle approaches the position in the target region at the moment, and the specific speed value is used for measuring a degree of which the obstacle approaches the position in the target region at the moment.

Further, in one or more embodiments, by introducing a covariance matrix, the probability that the obstacle is located at the position in the target region at the moment when traveling according to each predicted track is determined. For example, the unmanned device determines, for each predicted track corresponding to the obstacle and according to the traveling speed corresponding to the predicted track at the moment, a covariance matrix corresponding to the predicted track at the moment, and determines, according to the traveling speed corresponding to each predicted track of the obstacle at the moment and the covariance matrix corresponding to each predicted track at the moment, the probability that the obstacle is located at the position in the target region at the moment when traveling according to each predicted track.

The traveling speed corresponding to the predicted track at the moment is positively correlated with a value of a diagonal element in the covariance matrix corresponding to the predicted track at the moment. That is, a larger traveling speed corresponding to the predicted track at the moment indicates a larger value of the diagonal element in the covariance matrix corresponding to the predicted track at the moment. In other words, after the obstacle travels according to the predicted track, a traveling direction at the moment points to or approximately points to the position in the target region. Therefore, when a specific speed value of the obstacle at the moment is larger, the probability that the obstacle is located at the position in the target region at the moment is further improved under the action of the covariance matrix.

Certainly, in one or more embodiments, the unmanned device may further fuse the foregoing manners, to determine the probability that the obstacle is located at the position in the target region at the moment when traveling according to each predicted track, for example, refer to the following formula:

$$p_i(X_a^{t'}=C)=e^{-1/2(C-\bar{X}_a^{t'})R_a(\Sigma_a^{t'})^{-1}R_a^T(C-\bar{X}_a^{t'})^T}*I((C-\bar{X}_a^{t'})^T(v_a^{t'})\geq 0)$$

In the formula, $p_i(X_a^{t'}=C)$ represents a probability that the first obstacle a is located at the position C in the target region at the $p_i(X_a^{t'}=C)$ moment after traveling according to a predicted track i, $\Sigma_a^{t'}$ represents a covariance matrix corresponding to the first obstacle a at the t' moment, and $\bar{X}_a^{t'}$ represents an expected position of the first obstacle a after the first obstacle a travels according to the predicted track i at the t' moment. $v_a^{t'}$ represents a corresponding traveling speed at the t' moment after the first obstacle a travels according to the predicted track i, for example, represented in a form of $v_a^{t'}=(v_x, v_y)^T$.

$R_a$ is a coordinate rotation matrix, for example, represented according to $$R_a = \frac{1}{\|v_a^{t'}\|}\begin{pmatrix} v_x & v_y \\ -v_y & v_x \end{pmatrix}.$$

In one or more embodiments, $I((C-\overline{X}_a^{t'})^T (v_a^{t'}) \geq 0)$ is understood as an event characteristic function, that is, includes the following two cases: (1) after the first obstacle a travels according to the predicted track i, the position C is in a forward direction of the first obstacle a (that is, a traveling direction of the first obstacle a at the t' moment points to the position C), and a function value of the function is 1 as a whole; and (2) after the first obstacle a travels according to the predicted track i, the position C is not in the forward direction of the first obstacle a (that is, the traveling direction of the first obstacle a at the t' moment does not point to the position C, and the function value of the function is 0 as a whole.

In the formula, a probability that an obstacle is located at one position at one moment after traveling according to one predicted track is determined from a plurality of perspectives. However, each term also reflects a relationship with a corresponding probability. For example, in the formula, when $C-\overline{X}_a^{t'}$ is smaller, an exponential term of e is larger as a whole, and it indicates that when a distance between an expected position of the first obstacle a at the t' moment and the position C is shorter, the probability that the first obstacle a is located at the position C at the t' moment after traveling according to the predicted track i is larger. Similarly, under the action of the event characteristic function I, when the traveling direction of the first obstacle a at the t' moment after the first obstacle a travels according to the predicted track i points to the position C, it indicates that the probability that the first obstacle a is located at the position C at the t' moment after traveling according to the predicted track i is larger, otherwise, the probability is smaller.

In one or more embodiments, two or more obstacles often appear around the unmanned device. Therefore, the unmanned device needs to determine a collision condition between the obstacles at each position at each moment. For example, when determining a collision probability that a collision with one obstacle occurs at one position in a target region at one moment, the unmanned device determines, for each of other obstacles and according to an overall probability that the obstacle is located at the position at the moment and overall probabilities that the other obstacles are located at the position at the moment, collision probabilities that the other obstacles collide with the obstacle at the position at the moment. Subsequently, the unmanned device determines, for the collision probabilities that the other obstacles collide with the obstacle, the collision probability that the collision with the obstacle occurs at the position at the moment.

A formula $P(X_a^{t'} \cap X_b^{t'}=C)=P(X_a^{t'}=C)P(X_b^{t'}=C)$ has shown a determined collision probability that two obstacles collide at one position at one moment. The collision probabilities that a plurality of obstacles collide at one position may be determined by using, for example, the following formula:

$$P(X_a^{t'} = C) = 1 - \prod_{j=1}^{m}\left(1 - P\left(X_a^{t'} \cap X_{F_j}^{t'} = C\right)\right)$$

In the formula, $F_j$ is used for representing a $j^{th}$ second obstacle (j is a positive integer), m is used for representing a quantity of second obstacles (m is a positive integer), and $P(X_a^{t'} \cap X_{F_j}^{t'}=C)$ is used for representing a collision probability that the first obstacle a collides with the $j^{th}$ second obstacle at the position C at the t' moment.

The term $(1-P(X_a^{t'} \cap X_{F_j}^{t'}=C))$ is used for representing a probability that the first obstacle a does not collide with the $j^{th}$ second obstacle at the position C at the t' moment. Continued multiplication is performed on probabilities that the first obstacle a does not collide with the second obstacles at the position C at the t' moment, and then a probability value obtained after the continued multiplication is subtracted from 1, to obtain the collision probability that the first obstacle collides a at the position C at the t' moment.

In one or more embodiments, the unmanned device can also determine the collision probability that the collision with the obstacle occurs at the position at the moment in another manner. For example, after determining the collision probabilities that the other obstacles collide with the obstacle, the unmanned device determines, according to a maximum collision probability of the collision probability that each of the other obstacles collides with the obstacle, the collision probability that the collision with the obstacle occurs at the position at the moment, for example, refer to the following formula:

$$P(X_a^{t'}=C)=\max\{P(X_a^{t'} \cap X_{F_1}^{t'}=C), P(X_a^{t'} \cap X_{F_2}^{t'}=C), \ldots, P(X_a^{t'} \cap X_{F_m}^{t'}=C)\}$$

It can be learned from the formula that the unmanned device uses a maximum value of a collision probability that the first obstacle a collides with each of all the second obstacles as the collision probability that the collision with the first obstacle a occurs at the position C at the t' moment.

S104. Determine, according to the collision probability that the collision with the obstacle occurs at each position in the target region at the moment, a global collision probability that the collision with the obstacle occurs in the entire target region at the moment.

In one or more embodiments, after determining the collision probability that the collision with the obstacle occurs at each position in the target region at the moment, the unmanned device performs summation on the collision probabilities, to determine a global collision probability that the collision with the obstacle occurs in the entire target region at the moment. The global collision probability can reflect an overall situation whether the collision with the obstacle occurs in the target region at the moment. The global collision probability is determined by using, for example, the following formula:

$$P(a^{t'}) = \sum_{C_k} p_{C_k}(a^{t'})$$

In the formula, $C_k$ is used for representing positions in a target region, and the collision probabilities that the collision with the first obstacle a at the positions in the target region at the t' moment are added, to obtain a global collision probability that the collision with the first obstacle a occurs in the entire target region at the t' moment.

In one or more embodiments, the unmanned device may also determine the global collision probability in another manner. For example, the unmanned device determines a position weight matrix corresponding to the target region, where in the position weight matrix, each position in the target region corresponding to a weight value. For each position in the target region, a distance between the position and a current position of the unmanned device is negatively correlated with a weight corresponding to the position in the position weight matrix. That is, a longer distance between the position and the current position of the unmanned device indicates a smaller weight value corresponding to the position in the position weight matrix. Conversely, a shorter distance between the position and the current position of the unmanned device indicates a larger weight value corresponding to the position in the position weight matrix.

In one or more embodiments, the unmanned device determines, according to the collision probability that the collision with the obstacle occurs at each position in the target region at the moment and the position weight matrix corresponding to the target region, the global collision probability that the collision with the obstacle occurs in the entire target region at the moment, for example, refer to the following formula:

$$P(a^{t'}) = \sum_{C_k} p_{C_k}(a^{t'}) * Ker_{a^t}(C_k)$$

$Ker_a{}^t(C_k)$ is the mentioned position weight matrix, and the position weight matrix can further be understood as a convolution kernel in which a position (that is, the current position) of the first obstacle a at the t' moment is a center point.

It should be noted that, in one or more embodiments, different target regions correspond to different position weight matrices. In some other embodiments, position weight matrices of different target regions are the same. For a case that the position weight matrices are the same, the same position weight matrix is used for all the cases by default. This is not limited in this embodiment of this application.

S105. Control the unmanned device in the future period of time according to the global collision probability corresponding to each obstacle at each moment.

After the global collision probability corresponding to each obstacle at each moment in the future period of time is determined, it may be determined whether a collision occurs at each position in the entire target region at each moment in the future period of time, and then the unmanned device is controlled in the future period of time. For example, if a relatively high probability that a collision with an obstacle occurs in a target region at a moment in a future period of time is determined, when the unmanned device reaches the moment, the unmanned device is controlled to travel slowly or stop.

According to the embodiments of the present disclosure, an unmanned device predicts at least one predicted tracks of surrounding obstacles in a future period of time; and determines, based on the predicted tracks, global collision situations of the obstacles in a target region to which the unmanned device is going. Based on the determined global collision conditions, the unmanned device can manipulate the driving control. For example, the unmanned device may be controlled to drive with a lower speed or stop at certain time in the case that a collision between the obstacles may exist to avoid collision accidents in the target region in the future period of time.

The foregoing describes the unmanned device control method based on a future collision risk in one or more embodiments of this application. The unmanned device control method of this application may be implemented by an unmanned device control apparatus.

Figure 4:
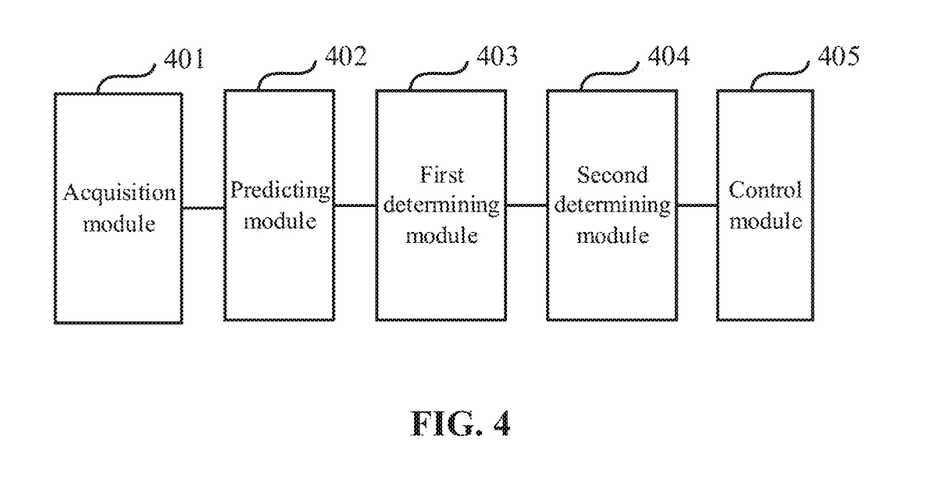
FIG. 4 is a schematic diagram of an unmanned device control apparatus based on a future collision risk according to this application.

FIG. 4 is a schematic diagram of an unmanned device control apparatus based on a future collision risk according to this application. The apparatus specifically includes:
an acquisition module 401, configured to acquire sensing data of obstacles around an unmanned device;

a predicting module 402, configured to determine, for each obstacle and according to the sensing data, at least one traveling track of the obstacle in a future period of time, to obtain a predicted track corresponding to the obstacle;

a first determining module 403, configured to determine, for each moment in the future period of time and according to the predicted track corresponding to the obstacle, a collision probability that a collision with the obstacle occurs at each position in a target region at the moment, where the target region is a region in which the unmanned device is located in the future period of time;

a second determining module 404, configured to determine, according to the collision probability that the collision with the obstacle occurs at each position in the target region at the moment, a global collision probability that the collision with the obstacle occurs in the entire target region at the moment; and a control module 405, configured to control the unmanned device in the future period of time according to the global collision probability corresponding to each obstacle at each moment.

In one or more embodiments, the first determining module 403 is configured to determine, for each position in the target region, an overall probability that the obstacle is located at the position at the moment; and determine, according to the overall probability that the obstacle is located at the position at the moment and overall probabilities that other obstacles are located at the position at the moment, the collision probability that the collision with the obstacle occurs at the position at the moment.

In one or more embodiments, the first determining module 403 is configured to determine a selection probability corresponding to each predicted track corresponding to the obstacle, where the selection probability indicates a probability that the obstacle selects the predicted track to travel in the future period of time; and determine, according to the selection probability corresponding to each predicted track corresponding to the obstacle and a determined probability that the obstacle is located at the position at the moment when traveling according to each predicted track, the overall probability that the obstacle is located at the position at the moment.

In one or more embodiments, the first determining module 403 is configured to determine, for each predicted track corresponding to the obstacle, an expected position of the obstacle at the moment when the obstacle travels according to the predicted track; determine a position deviation corresponding to the obstacle in the predicted track, where the position deviation indicates a position deviation between the expected position and the position; and determine, according to the position deviation corresponding to the obstacle in each predicted track, the probability that the obstacle is located at the position at the moment when traveling according to each predicted track, where the position deviation corresponding to the obstacle in each predicted track is negatively correlated with the probability that the obstacle is located at the position at the moment when traveling according to each predicted track.

In one or more embodiments, the first determining module 403 is configured to determine, for each predicted track corresponding to the obstacle, a corresponding traveling speed when the obstacle travels according to the predicted track at the moment as the traveling speed corresponding to the predicted track at the moment; and determine, according to the traveling speed corresponding to each predicted track of the obstacle at the moment, the probability that the obstacle is located at the position at the moment when traveling according to each predicted track, where a distance between the obstacle and the position at the moment is negatively correlated with the probability that the obstacle is located at the position at the moment when traveling according to each predicted track.

In one or more embodiments, the first determining module 403 is configured to determine, for each predicted track corresponding to the obstacle, a covariance matrix corresponding to the predicted track at the moment according to the traveling speed corresponding to the predicted track at the moment, where the traveling speed corresponding to the predicted track at the moment is positively correlated with a value of a diagonal element in the covariance matrix corresponding to the predicted track at the moment; and determine, according to the traveling speed corresponding to each predicted track of the obstacle at the moment and the covariance matrix corresponding to each predicted track at the moment, the probability that the obstacle is located at the position at the moment when traveling according to each predicted track.

In one or more embodiments, the first determining module 403 is further configured to determine, for each of other obstacles and according to the overall probability that the obstacle is located at the position at the moment and the overall probabilities that the other obstacles are located at the position at the moment, collision probabilities that the other obstacles collide with the obstacle at the position at the moment; and determine, according to a maximum collision probability of the collision probability that each of the other obstacles collides with the obstacle, the collision probability that the collision with the obstacle occurs at the position at the moment.

In one or more embodiments, the second determining module 404 is further configured to determine a position weight matrix corresponding to the target region, where in the position weight matrix, each position in the target region corresponds to a weight, and for each position in the target region, a distance between the position and a current position of the unmanned device is negatively correlated with a weight corresponding to the position in the position weight matrix; and determine, according to the collision probability that the collision with the obstacle occurs at each position in the target region at the moment and the position weight matrix corresponding to the target region, the global collision probability that the collision with the obstacle occurs in the entire target region at the moment.

This application further provides a computer-readable storage medium, storing a computer program, where the computer program may be used for performing the unmanned device control method based on a future collision risk provided in FIG. 1.

This application provides an unmanned device, including a memory, a processor, and a computer program stored on the memory and capable of being run on the processor, where the processor, when executing the program, implements the unmanned device control method based on a future collision risk in FIG. 1.

Figure 5:
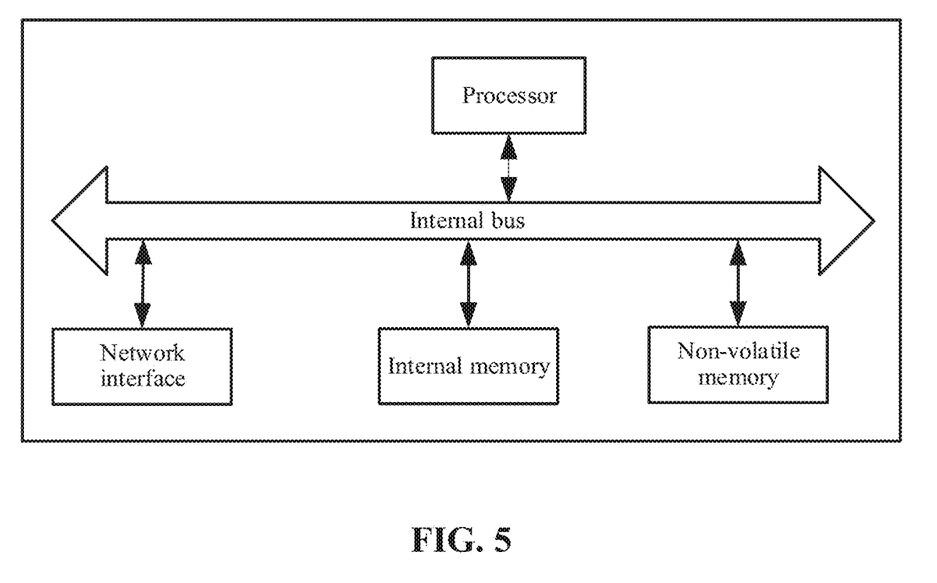
FIG. 5 is a schematic diagram of an unmanned device corresponding to FIG. 1 according to this application.

For example, this application further provides a schematic structural diagram of an unmanned device shown in FIG. 5 As shown in FIG. 5, at the hardware level, the unmanned device includes a processor, an internal bus, a network interface, an internal memory, and a non-volatile memory, and certainly may further include hardware required for other services. The processor reads a corresponding computer program from a non-volatile memory into the memory and then runs the computer program, to implement the unmanned device control method based on a future collision risk in FIG. 1. Certainly, in addition to a software implementation, this application does not exclude another implementation, such as a logic device, or a combination of software and hardware. In other words, the execution body of the following processing flow is not limited to each logic unit, or may be hardware or the logic device.

In the 1990s, improvements of a technology can be clearly distinguished as hardware improvements (for example, improvements to a circuit structure such as a diode, a transistor, or a switch) or software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as part of the memory control logic. A person skilled in the art will also appreciate that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments may be implemented by a computer chip or an entity, or implemented by a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, during implementation of this application, the function of the units may be implemented in the same piece of or multiple pieces of software and/or hardware.

A person skilled in the art should understand that the embodiments of the present invention may be provided as a method, a system, or a computer program product. Therefore, the present invention may be in a form of complete hardware embodiments, complete software embodiments, or combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a computer storage medium include but are not limited to a phase-change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette tape, a magnetic tape, a magnetic disk storage or other magnetic storage device, or any other non-transmission medium, which may be configured to store information accessible by a computing device. Based on the definition in this specification, the computer-readable medium does not include transitory computer-readable media (transitory media), such as a modulated data signal and a carrier.

The foregoing descriptions are merely embodiments of this application, and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. An unmanned device control method based on a future collision risk, the method comprising:

acquiring sensing data of obstacles around an unmanned device;

determining, for each obstacle and according to the sensing data, at least one traveling track of the obstacle in a future period of time, to be used as a predicted track corresponding to the obstacle;

determining, for each moment in the future period of time and according to the predicted track corresponding to the obstacle, a collision probability that a collision with the obstacle occurs at each position in a target region at the moment, wherein the target region is a region in which the unmanned device is located in the future period of time;

determining, according to the collision probability that the collision with the obstacle occurs at each position in the target region at the moment, a global collision probability that the collision with the obstacle occurs in the entire target region at the moment; and controlling the unmanned device in the future period of time according to the global collision probability corresponding to each obstacle at each moment, wherein the determining, for each moment in the future period of time and according to the predicted track corresponding to the obstacle, a collision probability that a collision with the obstacle occurs at each position in a target region at the moment comprises:

determining, for each position in the target region, an overall probability that the obstacle is located at the position in the target region at the moment; and determining, according to the overall probability that the obstacle is located at the position in the target region at the moment and overall probabilities that other obstacles are located at the position in the target region at the moment, the collision probability that the collision with the obstacle occurs at the position in the target region at the moment; and wherein the determining, according to the overall probability that the obstacle is located at the position in the target region at the moment and overall probabilities that other obstacles are located at the position in the target region at the moment, the collision probability that the collision with the obstacle occurs at the position at the moment comprises:

determining, for each of other obstacles and according to the overall probability that the obstacle is located at the position in the target region at the moment and the overall probabilities that the other obstacles are located at the position in the target region at the moment, collision probabilities that the other obstacles collide with the obstacle at the position at the moment; and determining, according to a maximum collision probability of the collision probabilities for each of the other obstacles that could collide with the obstacle, the collision probability that the collision with the obstacle occurs at the position at the moment.

2. The method according to claim 1, wherein the determining an overall probability that the obstacle is located at the position in the target region at the moment comprises:

determining a selection probability corresponding to each predicted track corresponding to the obstacle, wherein the selection probability indicates a probability that the obstacle selects the predicted track to travel in the future period of time; and determining, according to the selection probability corresponding to each predicted track corresponding to the obstacle and a determined probability that the obstacle is located at the position in the target region at the moment when traveling according to each predicted track, the overall probability that the obstacle is located at the position in the target region at the moment.

3. The method according to claim 2, wherein determining the probability that the obstacle is located at the position in the target region at the moment when traveling according to each predicted track comprises:

determining, for each predicted track corresponding to the obstacle, an expected position of the obstacle at the moment when the obstacle travels according to the predicted track;

determining a position deviation corresponding to the obstacle in the predicted track, wherein the position deviation indicates a position deviation between the expected position and the position in the target region; and determining, according to the position deviation corresponding to the obstacle in each predicted track, the probability that the obstacle is located at the position in the target region at the moment when traveling according to each predicted track, wherein the position deviation corresponding to the obstacle in each predicted track is negatively correlated with the probability that the obstacle is located at the position at the moment when traveling according to each predicted track.

4. The method according to claim 2, wherein the determining the probability that the obstacle is located at the position in the target region at the moment when traveling according to each predicted track comprises:

determining, for each predicted track corresponding to the obstacle, a corresponding traveling speed at the moment when the obstacle travels according to the predicted track; and determining, according to the traveling speed corresponding to each predicted track of the obstacle at the moment, the probability that the obstacle is located at the position in the target region at the moment when traveling according to each predicted track, wherein a distance between the obstacle and the position in the target region at the moment is negatively correlated with the probability that the obstacle is located at the position in the target region at the moment when traveling according to each predicted track.

5. The method according to claim 4, wherein the determining, according to the traveling speed corresponding to each predicted track of the obstacle at the moment, the probability that the obstacle is located at the position in the target region at the moment when traveling according to each predicted track comprises:

determining, for each predicted track corresponding to the obstacle, a covariance matrix corresponding to the predicted track at the moment according to the traveling speed corresponding to the predicted track at the moment, wherein the traveling speed corresponding to the predicted track at the moment is positively correlated with a value of a diagonal element in the covariance matrix corresponding to the predicted track at the moment; and determining, according to the traveling speed corresponding to each predicted track of the obstacle at the moment and the covariance matrix corresponding to each predicted track at the moment, the probability that the obstacle is located at the position in the target region at the moment when traveling according to each predicted track.

6. The method according to claim 1, wherein the determining, according to the collision probability that the collision with the obstacle occurs at each position in the target region at the moment, a global collision probability that the collision with the obstacle occurs in the entire target region at the moment comprises:

determining a position weight matrix corresponding to the target region, wherein in the position weight matrix, each position in the target region corresponds to a weight, and for each position in the target region, a distance between the position and a current position of the unmanned device is negatively correlated with a weight corresponding to the position in the position weight matrix; and determining, according to the collision probability that the collision with the obstacle occurs at each position in the target region at the moment and the position weight matrix corresponding to the target region, the global collision probability that the collision with the obstacle occurs in the entire target region at the moment.

7. An unmanned device, including a memory, a processor, and a computer program stored in the memory and capable of being run on the processor, wherein the processor, when executing the program, implements the following steps:

acquiring sensing data of obstacles around an unmanned device;

determining, for each obstacle and according to the sensing data, at least one traveling track of the obstacle in a future period of time, to obtain a predicted track corresponding to the obstacle;

determining, for each moment in the future period of time and according to the predicted track corresponding to the obstacle, a collision probability that a collision with the obstacle occurs at each position in a target region at the moment, wherein the target region is a region in which the unmanned device is located in the future period of time;

determining, according to the collision probability that the collision with the obstacle occurs at each position in the target region at the moment, a global collision probability that the collision with the obstacle occurs in the entire target region at the moment; and controlling the unmanned device in the future period of time according to the global collision probability corresponding to each obstacle at each moment, wherein the processor, when executing the program, implements the following steps:

determining, for each position in the target region, an overall probability that the obstacle is located at the position in the target region at the moment; and determining, according to the overall probability that the obstacle is located at the position in the target region at the moment and overall probabilities that other obstacles are located at the position in the target region at the moment, the collision probability that the collision with the obstacle occurs at the position in the target region at the moment; and wherein the processor, when executing the program, implements the following steps:

determining, for each of other obstacles and according to the overall probability that the obstacle is located at the position in the target region at the moment and the overall probabilities that the other obstacles are located at the position at the moment, collision probabilities that the other obstacles collide with the obstacle at the position in the target region at the moment; and determining, according to a maximum collision probability of the collision probabilities for each of the other obstacles that could collide with the obstacle, the collision probability that the collision with the obstacle occurs at the position in the target region at the moment.

8. The device according to claim 7, wherein the processor, when executing the program, implements the following steps:

determining a selection probability corresponding to each predicted track corresponding to the obstacle, wherein the selection probability indicates a probability that the obstacle selects the predicted track to travel in the future period of time; and determining, according to the selection probability corresponding to each predicted track corresponding to the obstacle and a determined probability that the obstacle is located at the position in the target region at the moment when traveling according to each predicted track, the overall probability that the obstacle is located at the position in the target region at the moment.

9. The device according to claim 8, wherein the processor, when executing the program, implements the following steps:

determining, for each predicted track corresponding to the obstacle, an expected position of the obstacle at the moment when the obstacle travels according to the predicted track;

determining a position deviation corresponding to the obstacle in the predicted track, wherein the position deviation indicates a position deviation between the expected position and the position in the target region; and determining, according to the position deviation corresponding to the obstacle in each predicted track, the probability that the obstacle is located at the position in the target region at the moment when traveling according to each predicted track, wherein the position deviation corresponding to the obstacle in each predicted track is negatively correlated with the probability that the obstacle is located at the position in the target region at the moment when traveling according to each predicted track.

10. The device according to claim 8, wherein the processor, when executing the program, implements the following steps:

determining, for each predicted track corresponding to the obstacle, a corresponding traveling speed at the moment when the obstacle travels according to the predicted track; and determining, according to the traveling speed corresponding to each predicted track of the obstacle at the moment, the probability that the obstacle is located at the position in the target region at the moment when traveling according to each predicted track, wherein a distance between the obstacle and the position at the moment is negatively correlated with the probability that the obstacle is located at the position in the target region at the moment when traveling according to each predicted track.

11. The device according to claim 10, wherein the processor, when executing the program, implements the following steps:

determining, for each predicted track corresponding to the obstacle, a covariance matrix corresponding to the predicted track at the moment according to the traveling speed corresponding to the predicted track at the moment, wherein the traveling speed corresponding to the predicted track at the moment is positively correlated with a value of a diagonal element in the covariance matrix corresponding to the predicted track at the moment; and determining, according to the traveling speed corresponding to each predicted track of the obstacle at the moment and the covariance matrix corresponding to each predicted track at the moment, the probability that the obstacle is located at the position in the target region at the moment when traveling according to each predicted track.

12. The device according to claim 7, wherein the processor, when executing the program, implements the following steps:

determining a position weight matrix corresponding to the target region, wherein in the position weight matrix, each position in the target region corresponds to a weight, and for each position in the target region, a distance between the position and a current position of the unmanned device is negatively correlated with a weight corresponding to the position in the position weight matrix; and determining, according to the collision probability that the collision with the obstacle occurs at each position in the target region at the moment and the position weight matrix corresponding to the target region, the global collision probability that the collision with the obstacle occurs in the entire target region at the moment.

13. A computer-readable storage medium storing a computer program, wherein the computer program, when being executed by a processor, implements the following steps:

acquiring sensing data of obstacles around an unmanned device;

determining, for each obstacle and according to the sensing data, at least one traveling track of the obstacle in a future period of time to be used as a predicted track corresponding to the obstacle;

determining, for each moment in the future period of time and according to the predicted track corresponding to the obstacle, a collision probability that a collision with the obstacle occurs at each position in a target region at the moment, wherein the target region is a region in which the unmanned device is located in the future period of time;

determining, according to the collision probability that the collision with the obstacle occurs at each position in the target region at the moment, a global collision probability that the collision with the obstacle occurs in the entire target region at the moment; and controlling the unmanned device in the future period of time according to the global collision probability corresponding to each obstacle at each moment, wherein the computer program, when being executed by the processor, implements the following steps:

determining, for each position in the target region, an overall probability that the obstacle is located at the position in the target region at the moment; and determining, according to the overall probability that the obstacle is located at the position in the target region at the moment and overall probabilities that other obstacles are located at the position in the target region at the moment, the collision probability that the collision with the obstacle occurs at the position in the target region at the moment; and wherein the computer program, when being executed by the processor, implements the following steps:

determining, for each of other obstacles and according to the overall probability that the obstacle is located at the position in the target region at the moment and the overall probabilities that the other obstacles are located at the position at the moment, collision probabilities that the other obstacles collide with the obstacle at the position in the target region at the moment; and determining, according to a maximum collision probability of the collision probabilities for each of the other obstacles that could collide with the obstacle, the collision probability that the collision with the obstacle occurs at the position in the target region at the moment.

14. The storage medium according to claim 13, wherein the computer program, when being executed by the processor, implements the following steps:

determining a selection probability corresponding to each predicted track corresponding to the obstacle, wherein the selection probability indicates a probability that the obstacle selects the predicted track to travel in the future period of time; and determining, according to the selection probability corresponding to each predicted track corresponding to the obstacle and a determined probability that the obstacle is located at the position in the target region at the moment when traveling according to each predicted track, the overall probability that the obstacle is located at the position in the target region at the moment.

15. The storage medium according to claim 14, wherein the computer program, when being executed by the processor, implements the following steps:

determining, for each predicted track corresponding to the obstacle, an expected position of the obstacle at the moment when the obstacle travels according to the predicted track;

determining a position deviation corresponding to the obstacle in the predicted track, wherein the position deviation indicates a position deviation between the expected position and the position in the target region; and determining, according to the position deviation corresponding to the obstacle in each predicted track, the probability that the obstacle is located at the position in the target region at the moment when traveling according to each predicted track, wherein the position deviation corresponding to the obstacle in each predicted track is negatively correlated with the probability that the obstacle is located at the position in the target region at the moment when traveling according to each predicted track.

* * * * *